United States Patent [19]
Witt

[11] 3,974,101

[45] *Aug. 10, 1976

[54] OLEFIN POLYMERIZATION CATALYST

[75] Inventor: Donald R. Witt, Bartlesville, Okla.

[73] Assignee: Phillips Petroleum Company, Bartlesville, Okla.

[ * ] Notice: The portion of the term of this patent subsequent to Aug. 19, 1992, has been disclaimed.

[22] Filed: Sept. 16, 1974

[21] Appl. No.: 505,997

Related U.S. Application Data

[63] Continuation-in-part of Ser. No. 79,316, Oct. 8, 1970, Pat. No. 3,900,457.

[52] U.S. Cl. ............................ 252/458; 252/467
[51] Int. Cl.$^2$........................................... B01J 29/00
[58] Field of Search ............ 423/338; 252/451, 452, 252/458, 467

[56] References Cited
UNITED STATES PATENTS

| | | | |
|---|---|---|---|
| 2,429,319 | 10/1947 | Kearby | 252/451 |
| 2,978,298 | 4/1961 | Wetzel | 252/451 |

*Primary Examiner*—L. Dewayne Rutledge
*Assistant Examiner*—Michael L. Lewis

[57] ABSTRACT

A method for preparing silica-containing olefin polymerization catalysts, and the process performable therewith, the preparation involving adding an alkali metal silicate to an acid under defined conditions of addition to produce a hydrogel, recovering the gel in the substantially dry condition by employment of an oxygenated organic compound and impregnating the gel with a chromium compound.

9 Claims, No Drawings

OLEFIN POLYMERIZATION CATALYST

OLEFIN POLYMERIZATION CATALYST

This application is a continuation-in-part application of my copending application having Ser. No. 79,316, filed Oct. 8, 1970, now U.S. Pat. No. 3,900,457.

This invention relates to olefin polymerization.

In one of its more specific aspects, this invention relates to a polymerization process which employs an improved catalyst.

It is known that the melt indices of olefin polymers, such as polyethylene, are dependent upon the character of the catalyst. A discussion of this subject as pertaining to that process, the general nature of which is set forth in U.S. Pat. No. 2,825,721, to Hogan et al, is contained in U.S. Pat. No. 3,225,023 to Hogan et al, both of these patents being incorporated herein by reference.

It has now been determined that the melt indices of such polymers are affected by the method by which that material used as the catalyst support is prepared and by the method in which that support is incorporated into the catalyst.

The method of this invention provides a method for preparing a catalyst which produces polymers by the particle form process having higher melt indices than have previously been produced by such process. Such polymers possess properties superior to those presently available and which have a much wider range of utility than do present polymers.

According to this invention there is provided a method for the preparation of an olefin polymerization catalyst. An alkali metal silicate is added to an acid and an aqueous gel, or hydrogel, is formed. The gel is aged, washed and mixed with a normally liquid oxygen-containing organic compound. The organic compound and water are then removed to produce a substantially water-free catalyst support, a xerogel. The xerogel is then impregnated with a chromium compound.

Also, according to this invention there is provided a process for the polymerization of at least one polymerizable olefin at a polymerization temperature up to about 500°F. with a catalyst active for such polymerization and comprising chromium oxide and the silica-containing substrate, at least part of the chromium being in the hexavalent state at the initial contacting of hydrocarbon with the catalyst, the substrate or support of the catalyst and the catalyst being prepared in accordance with the method of this invention.

The general nature of the process to which the method of this invention applies is that process in which a hydrogel is prepared by mixing an aqueous solution of the alkali metal silicate with a strong acid such as sulfuric acid or a weak acid such as carbonic acid, this mixing being done under suitable conditions of agitation. The concentration of the $SiO_2$ in the hydrogel which is formed is usually in the range of between about 3 and about 12 weight percent with the pH of that gel being from about 3 to about 9. A wide range of mixing temperatures can be employed, this range being from about 33°F. to about 110°F.

After gelling, the mixture is aged. This can be carried out at the usual temperatures within the range of about 65°F. to about 200°F. Generally, aging times greater than one hour are used.

Following aging, the gel is agitated to produce a slurry which is washed several times with water and with either an ammonium salt solution or dilute acid to reduce the alkali metal content of the gel to less than about 0.1 weight percent. While various ammonium salts and dilute acid solutions can be employed, the preferred salts are those, such as ammonium nitrate and ammonium salts of organic acid, which decompose and volitalize upon subsequent calcination.

Water is removed from the hydrogel by washing with a normally liquid organic compound which is soluble in water, or by azeotropic distillation employing an organic compound. This procedure produces a silica xerogel which is used as a substrate.

Thereafter, the silica is impregnated with a chromium compound which is subsequently converted to chromium oxide, at least part of the chromium being in the hexavalent state in which form the composition is employed as a catalyst in olefin polymerization.

The present invention pertains to modifications applicable to the process of preparing the substrate. However, the method of this invention applies to all methods which are generally related to the above procedure and is not to be considered as being limited to the process conditions specifically described above.

The present invention produces a superior substrate and a superior chromium-containing catalyst by a combination of steps which pertain to the mixing of the alkali metal compound with an acidic compound, the rate at which the mixing is carried out, and the removal of the water from the substantially purified hydrogel.

In the method of this invention, the alkali metal silicate is introduced into the acid in contrast to introducing the acid into the silicate. To the volume of acid which is to be employed, the silicate is added in any suitable manner while suitably agitating the mixture to facilitate the reaction between the silicate and the acid.

Also, in the method of this invention, the alkali metal silicate is preferably introduced into the acid at a controlled rate. The rate of addition can be constant or intermittent addition of the silicate can be made. In all instances, the silicate is added at such a rate that, on the average, from about 0.1 to about 15 weight percent of the total weight of sodium silicate to be added to the acid is added per minute of addition time. By addition time is meant the total period over which the addition is made, whether such addition is continuous or intermittent. For example, the bulk of the silicate can be added rapidly with the remainder of the silicate being added slowly, as long as the average rate of silica addition is met.

As concerns the removal of water from the hydrogel to produce the xerogel, the method of this invention forms a mixture of the hydrogel and a normally liquid oxygen-containing organic compound which is soluble in water. Removal of the water from the gel is effected by repeated washing with the organic compound or by azeotropic distillation. Preferably, azeotropic distillation is employed. Suitable oxygen-containing compounds include methyl isobutyl ketone, ethyl acetate, sec-butyl alcohol, n-propyl alcohol, butyraldehyde, diisobutyl ether, isopropyl acetate, and the like.

The substrate produced by the method of this invention is prepared for employment in olefin polymerization by depositing chromium salts on it by methods which include solution impregnation with chromium compounds, and dry mixing techniques.

The above-described method of removing the water from the hydrogel is directed towards removing sufficient water from the internal structure to substantially preserve such structure and that subsequent steps to which the substrate is subjected will not collapse the pores of the catalyst. For this reason, the substrate is impregnated with the chromium compound in the substantial absence of water. Relatedly, the substrate, after its preparation and before its impregnation, will preferably be maintained such that the quantity of moisture which it absorbs is limited such that when impregnated with the chromium compound from nonaqueous solutions or by dry mixing, such impregnation will occur substantially in the absence of water. The impregnation of the substrate with the chromium compounds is carried out by conventional methods and followed by the usual calcination. After calcining, the resulting catalyst is employed in olefin polymerization employing any of the techniques which are employed when utilizing catalysts comprising a chromium compound on a silica substrate.

The substrates produced by the method of this invention have a surface area of 200–500 meters$^2$/gram, a pore size of 200 to 600 A, a pore volume of 1.8 to 3.5 cc/gram based on nitrogen and a narrow pore size distribution.

Preferred embodiments of this invention are illustrated in the following runs in which silica, prepared according to the method of this invention, was employed as the substrate of a chromium oxide catalyst in the polymerization of ethylene. The invention is not to be considered as being limited by the specifics of the examples.

EXAMPLE I

The following data represent the results of a series of silica preparations. In these, various procedures were employed relative to the addition of the alkali metal silicate to the acid, and the oxygen-containing organic compound employed in the azeotropic distillation step to recover a substantially water-free silica xerogel. All steps were in accordance with the method of this invention.

Exclusive of variations in those steps pertinent to the invention, in all runs 186 parts by weight of water-glass having a 3.2 to 1 $SiO_2$ to $Na_2O$ ratio, a solids content of 38 percent and a density of 1.39 g/cc was diluted with 235 parts by weight of water, and the solution was added at the rates specified in each individual run to 27 parts by weight concentrated sulfuric acid (96 percent $H_2SO_4$) diluted with 200 parts by weight water. Additions were made at temperatures within the range of about 40°F. to 110°F. at atmospheric pressure. The volume of reactants was stirred throughout the addition period.

The various hydrogels were formed within the pH range of from about 3 to about 7 and their silica contents were within the range of from about 3 to about 12 weight percent. Each gel was allowed to age a minimum of two hours at temperatures within the range of 68° to 195°F.

The gel was slurried with deionized water. The water in this instance contained ammonium nitrate as an aid in purifying the gel. The effect of the washing was to exchange sodium sulfate and ammonium nitrate. In the experiments reported herein the gels were filtered, slurried and washed repeatedly with the ammonium nitrate solution, finally with deionized water until the sodium ion content of the gel had been reduced to less than about 1/10 weight percent based on the dried gel.

About 250–300 parts by weight of each gel was individually charged to a kettle-type distillation apparatus into which about 425 parts by weight of the organic compound specified was added. Azeotropic distillation was carried out with the overhead water product being rejected and the organic material being reintroduced into the distillation system. After removal of substantially all water from the silica, the organic compound was evaporated from the silica and the silica was recovered as a substantially dry gel.

Each silica was impregnated by mixing with t-butyl chromate dissolved in a suitable solvent, such as n-pentane, to deposit on the silica an amount such that the catalyst will contain about 1 weight percent chromium as chromium oxide. The impregnated silicas were activated in air at about 1600°F. Thereupon, each impregnated silica was individually employed, using conventional techniques, in the polymerization of ethylene.

The catalyst reported in Table IV prepared according to the invention was prepared as follows.

A first hydrogel was produced by adding 454 g of a sulfuric acid solution to 844 g of water glass solution. (The sulfuric acid solution was prepared from 54 g of 96% $H_2SO_4$ in 400 g of water, being an 11.4 weight percent solution. The water glass solution was a stock solution prepared from 380 g of water glass, containing 28.7 percent $SiO_2$ and 480 g of water, being a 12.7 weight percent solution.)

The addition was made over a period of 34 minutes to produce a hydrogel having a pH of 6.0.

This gel was aged for two hours at a temperature of 183°F. and was then washed to produce a substantially alkali metal-free hydrogel.

This hydrogel was contacted with ethyl acetate and water and ethyl acetate were separated from the hydrogel to produce a xerogel.

It was then impregnated with a solution comprising t-butyl chromate in n-pentane to incorporate about one weight percent chromium on the xerogel and activated to produce a catalyst active in ethylene polymerization.

The catalyst was employed in ethylene polymerization at 230°F. to produce polymers.

The melt index of the polymer was determined in accordance with ASTM procedure D 1238-62T, Condition E.

Ethylene was polymerized in contact with the individual catalysts at about 230°F. and about 550 psig until a yield of about 5000 parts by weight of polymer per part by weight of catalyst charged was obtained. Each polymer was recovered, sprayed with 0.05 weight percent each of dilaurylthiodipropionate, 2,6-di-tert-butyl-4-methylphenol and 4,4'-thiobis-(6-t-butyl-m-cresol), and dried by conventional techniques. The melt index was determined for the polymers produced according to the procedure of ASTM D 1238-62T (Condition E).

Results were as follows:

TABLE I

| Run No. | Silicate Added to Total Volume of Acid Rate of Addition, % of Total Sodium Silicate Added per min. | Compound Used in Azeotropic Distillation | Polymer M.I. |
|---|---|---|---|
| 1 | 1 | Ethyl acetate | 4.9 |
| 2 | 0.5 | Ethyl acetate | 4.6 |
| 3 | 0.25 | Ethyl acetate | 4.3 |
| 4 | 2.2 | Ethyl acetate | 4.7 |
| 5 | 2.1 | Ethyl acetate | 4.1 |

TABLE I-continued

| Run No. | Silicate Added to Total Rate of Addition, % of Total Sodium Silicate Added per min. | Volume of Acid Compound Used in Azeotropic Distillation | Polymer M.I. |
|---|---|---|---|
| 6 | 0.90 | Methyl isobutyl ketone | 3.7 |
| 7 | 0.90 | Methyl isobutyl ketone | 4.3 |

The above runs, all made in accordance with the method of this invention, in all instances produced a polymer having a high melt index. These polymers are novel inasmuch as heretofore, polymers having melt indices higher than about 3.2 have not been produced by such particle form polymerization processes.

To substantiate that the polymers having the properties shown above were the results of the combination of steps concerned, runs comparable to the above were carried out but in each run one of the several critical steps was not performed. These procedures are set forth below.

EXAMPLE II

The following data represent the results of a series of silica preparations in which one of the factors of the method of addition, that is, the method and rate of incorporation of the silicate into the acid, or the nature of the organic compound employed in producing the substantially water-free silica was outside of the scope of the invention.

In all other respects except as regards the particular deviation which is specified for each run, the method of preparation of the hydrogel, the method of separating the water from the hydrogel and the polymerization process were as described in Example I. Results of these runs were as follows:

TABLE II

| Run No. | Method of Addition | Rate of Addition, % of Total Sodium Silicate Added per min. | Water Removal Method | Polymer M.I. |
|---|---|---|---|---|
| 1 | acid to water glass | 1.1 | acetone wash | 0.89 |
| 2 | water glass to acid | 1.4 | n-octane azeotrope | 1.01 |
| 3 | water glass to acid | 1.4 | n-heptane azeotrope | 0.80 |
| 4 | water glass to acid | 1.3 | spray drying (from aqueous medium) | 1.5 |

These data illustrate the effect of not employing, in combination, all of the steps of the invention.

The substrates of this invention can be used in the preparation of catalysts for employment in any of the conventional particle form olefin polymerization processes. Generally the polymers produced will be those of ethylene or of ethylene and higher 1-olefins and will have melt indices between about 3.3 and about 6, with melt indices being as high as about 12 when employing hydrogen in the process, these melt indices being determined in accordance with ASTM D 1238-62T (Condition E).

After the washing of the hydrogel to produce a substantially alkali metal-free hydrous gel, a mixture is formed, this mixture being comprised principally of the hydrogel and an oxygen-containing organic compound. This mixture will contain no significant amounts of other organic compounds nor will the gel upon its removal from the oxygen-containing organic compound be contacted, to any appreciable extent, with an organic compound which does not contain oxygen and from which the gel is then separated before the impregnation of the gel with the chromium compound.

EXAMPLE III

A gel was produced by the method of this invention and, after formation, was repeatedly washed with acetone to remove the water. Thereafter, the gel was heated to remove the acetone.

The gel was then impregnated with a chromium compound and employed in ethylene polymerization. The melt index of the polymer was 4.0.

The above example illustrates that the water can be removed from the hydrogel by separating the oxygen-containing organic compound and water from the gel to produce the substantially water-free catalyst support by methods other than azeotropic distillation.

The ethylene homopolymers produced employing the catalyst of this invention will have flexural modulus values of from about 281,000 to about 297,000 psi, tensile strengths of about 5000 psi, elongation of 15 to 20 percent to break, and ratios of high load melt index to melt index of from about 36 to about 40, when determined by the usual ASTM Testing Procedures.

It will be evident from the foregoing that various modifications can be made to the method of this invention. Such, however, are considered as being within the scope of the invention.

EXAMPLES RELATED TO KEARBY U.S. PAT. NO. 2,429,319

Preliminary Preparation

Five liters of a colloidal silica solution were prepared by stirring 2-½ liters of a solution containing 517 cc of water glass having a specific gravity of 1.38 into 2-½ liters of a solution containing 200 cc of concentrated hydrochloric acid. This procedure was carried out as defined in U.S. Pat. No. 2,429,319 issued Oct. 21, 1947, to Kearby, Example 1. One liter of this solution was employed in each of the following examples.

EXAMPLE IV

One liter of the solution prepared in the Preliminary Preparation was treated in accordance with Example 5 of U.S. Pat. No. 2,429,319, including the wash with isopropyl alcohol. The silica-alumina composition was impregnated with chromium and activated substantially in accordance with the procedure of the invention.

The catalyst so produced was employed for ethylene polymerization substantially in accordance with the procedure of the invention.

The polymer produced, at a yield of 3000 g per g of catalyst, had a melt index of substantially 0 (4.64 High Load Melt Index, Condition F, ASTM D-1238-62).

EXAMPLE V

The procedure of Example 5 of the aforementioned patent was carried out with the exception that no aluminum compound and no agar-agar were incorporated in the silica composition.

The silica composition, impregnated with chromium and activated according to the procedure of Example IV, was employed for ethylene polymerization according to the procedure of Example IV above.

The polymer produced, at a yield of 5000 g per g of catalyst, had a melt index of 0.4.

EXAMPLE VI

The sol produced by the procedure of Example V jelled at a pH of 9.6. The procedure of Example V was repeated adding a smaller amount of ammonia to produce a gel at a pH of 7.2.

The silica composition, impregnated with chromium and activated according to the procedures of Example IV, was employed for ethylene polymerization according to the procedures of Example IV above.

The polymer produced, at a yield of about 4970 g per g of catalyst, had a melt index of 0.75.

EXAMPLE VII

The procedure of Example IV was carried out, using one-half of the quantities involved therein, except that no agar was employed.

The silica-alumina composition, impregnated with chromium and activated according to the procedures of Example IV, was employed for ethylene polymerization according to the procedures of Example IV above.

The polymer produced, at a yield of about 2170 g per gram of catalyst, had a melt index of substantially 0 (4.75 HLMI).

TABLE III

| | Catalyst Preparations According to Kearby Patent, U.S. 2,429,319 | | | |
|---|---|---|---|---|
| Example No. | Conditions of Preparation | Type of Material | Polymer Yield, g/g | Melt Index |
| IV | As per Example 5 of patent | SiAl | 3000 | 4.64 HLMI* |
| V | Left out agar + AlCl$_3$ | Si | 5000 | 0.4 |
| VI | Same as 2, but used less NH$_3$ | Si | 4970 | 0.75 |
| VII | Left out agar | SiAl | 2170 | 4.75 HLMI |

*HLMI = High load melt index, Condition F, ASTM D-1238-62.

TABLE IV

| Example No. | Surface Area | Pore Volume | Pore Diameter |
|---|---|---|---|
| IV | 173 | 0.71 | 164 |
| V | 439 | 1.25 | 114 |
| VI | 473 | 1.55 | 131 |
| VII | 329 | 0.64 | 78 |
| ** | 533 | 2.68 | 202 |

**Prepared according to the invention.

What is claimed is:

1. A method of preparing a silica-containing composition comprising:

a. adding an alkali metal silicate to an acid selected from sulfuric acid and carbonic acid to form a hydrogel;
   b. aging the hydrogel;
   c. washing the aged hydrogel to produce a substantially alkali metal-free hydrogel;
   d. forming a mixture comprising the washed hydrogel and a normally liquid oxygen-containing, water-soluble organic compound;
   e. separating said organic compound and water from said mixture to form a xerogel;
   f. recovering said xerogel as said silica-containing composition, and
   g. impregnating said silica-containing xerogel composition with a chromium compound convertible to chromium oxide.

2. The method of claim 1 in which sodium silicate is added to sulfuric acid to produce said hydrogel and said organic compound and said water are separated from said mixture by azeotropic distillation.

3. The method of claim 2 in which said sodium silicate is added to said acid at a rate such that from about 0.1 to about 15 weight percent of the total weight of sodium silicate is added per minute of addition time to form a gel comprising hydrated silica.

4. The method of claim 2 in which said oxygen-containing organic compound is selected from the group consisting of methyl isobutyl ketone, ethyl acetate, sec-butyl alcohol, n-propyl alcohol, butyraldehyde, diisobutyl ether, and isopropyl acetate.

5. The method of claim 3 in which said hydrogel contains between about 3 and about 12 weight percent silica and the pH of said gel is between about 3 and about 9.

6. The method of claim 5 in which said oxygen-containing organic compound is selected from the group consisting of methyl isobutyl ketone, ethyl acetate, sec-butyl alcohol, n-propyl alcohol, butyraldehyde, diisobutyl ether, and isopropyl acetate and said azeotropic mixture has a boiling point temperature below the boiling point of said organic compound.

7. The method of claim 1 in which water-glass is added to sulfuric acid at a temperature between about 40° and about 110°F. at an average rate of addition of between about 0.25 and about 2.2 weight percent of the total water glass added per minute to form a hydrogel, and said mixture is formed with ethyl acetate.

8. The method of claim 1 in which sodium silicate is added to sulfuric acid to produce said hydrogel, and said hydrogel is washed with an oxygen-containing compound to remove water from said hydrogel.

9. The method of claim 1 in which the pH of the hydrogel when formed is within the range of from about 3 to about 9, the hydrogel is aged for a period greater than one hour at a temperature within the range of from about 65°F. to about 200°F., and said organic compound is ethyl acetate.

* * * * *